(12) United States Patent
Ranalli et al.

(10) Patent No.: US 9,391,392 B2
(45) Date of Patent: Jul. 12, 2016

(54) NON-PRESSURE COMPENSATED, WET-MATEABLE PLUG FOR FEEDTHROUGH AND OTHER SUBSEA SYSTEMS

(71) Applicant: Teledyne Instruments, Inc., Thousand Oaks, CA (US)

(72) Inventors: Richard Ranalli, Berwick, ME (US); John Brian O'Rourke, Lawrence, MA (US)

(73) Assignee: Teledyne Instruments, Inc., Thousand Oaks, CA (US)

(*) Notice: Subject to any disclaimer, the term of this patent is extended or adjusted under 35 U.S.C. 154(b) by 0 days.

(21) Appl. No.: 14/789,670

(22) Filed: Jul. 1, 2015

(65) Prior Publication Data

US 2016/0006161 A1 Jan. 7, 2016

Related U.S. Application Data

(60) Provisional application No. 62/020,234, filed on Jul. 2, 2014.

(51) Int. Cl.
*H01R 13/44* (2006.01)
*H01R 13/523* (2006.01)
*G02B 6/38* (2006.01)

(52) U.S. Cl.
CPC ............ *H01R 13/523* (2013.01); *G02B 6/3816* (2013.01)

(58) Field of Classification Search
CPC ............................ H01R 13/4538; H01R 35/02
USPC .................................................... 439/140, 196
See application file for complete search history.

(56) References Cited

U.S. PATENT DOCUMENTS

| 4,142,770 A * | 3/1979 | Butler, Jr. ............ H01R 13/523 439/140 |
| 7,032,310 B1 | 4/2006 | Appleford |
| 8,968,018 B2 * | 3/2015 | Sivik ........................ H02G 3/22 439/271 |
| 2004/0266240 A1 | 12/2004 | Abbey |
| 2014/0030904 A1 | 1/2014 | Head |

FOREIGN PATENT DOCUMENTS

| EP | 0298144 A1 | 1/1987 |
| EP | 2520757 A2 | 11/2012 |
| EP | 2853680 A1 | 4/2015 |

* cited by examiner

*Primary Examiner* — Phuongchi T Nguyen
(74) *Attorney, Agent, or Firm* — Duncan Galloway; Egan Greenwald, PLLC; Kevin T. Duncan (57) ABSTRACT

The invention provides a submersible or harsh environment connector for use with electrical, optical or electro-optical cables having first and second connector units which are releasably mateable and that are not pressure compensated. The invention provides a wet-mate without pressure balancing system for making a subsea wet-mate connection. The invention uses a reservoir of fluid and a mechanism energized by mating, such as by a spring, to push that fluid into a small mated connection, discharging an equivalent volume of seawater and creating electrical and/or optical continuity. One-way or back-flow prevent valves ensure there is no return flow of seawater. Typical fluids would be dielectric oil or optical gel.

22 Claims, 8 Drawing Sheets

NON-PRESSURE COMPENSATED, WET-MATEABLE PLUG FOR FEEDTHROUGH AND OTHER SUBSEA SYSTEMS

CROSS REFERENCE TO RELATED APPLICATION

The present invention claims benefit of priority to U.S. Prov. Pat. App. No. 62/020,234, entitled NON-PRESSURE COMPENSATED, WET-MATEABLE PLUG FOR FEEDTHROUGH SYSTEMS, filed on Jul. 2, 2014, and which is incorporated by reference herein in its entirety.

FIELD OF INVENTION

This invention generally relates to submersible or harsh environment electrical or optical or hybrid electro-optical connectors which can be mated and unmated in a harsh environment, such as underwater and at great depths, or at high operating temperatures or pressures, and in the presence of harsh chemicals. The invention may be used in feedthrough systems and more broadly in other oceanographic and defense applications.

BACKGROUND OF THE INVENTION

In offshore drilling and production operations, subsea "Christmas" trees are used on subsea wellheads and may be conventional, dual bore, mono bore, TFL (through flow line), horizontal, mudline, mudline horizontal, side valve, and TBT (through-bore tree) type trees. Subsea trees are often subjected to harsh conditions thousands of feet under the sea surface with working temperatures of −50° F. to 400° F. with pressures of up to 20,000 psi. Subsea Christmas trees control the flow of fluid, typically oil or gas, out of a well. Flow lines are connected between subsea wells and production facilities, such as a floating platform or a storage ship or barge. A subsea Christmas tree includes sensors and monitoring devices (such as pressure, temperature, corrosion, erosion, sand detection, flow rate, flow composition, valve and choke position feedback), and additional connection points for devices such as down hole pressure and temperature transducers. A control system on a subsea tree monitors, measures, and responds based on sensor inputs and outputs control signals to control subsea devices. For example, the control system attached to the subsea tree controls down-hole safety valves. Functional and operational requirements of subsea trees have become increasingly complex along with sensing and monitoring equipment and control systems used to insure proper operation.

To connect the numerous and various sensing, monitoring and control equipment necessary to operate subsea Christmas trees, harsh environment connectors are used with electrical cables, optical fiber cables, or hybrid electro-optical cables. Initial demand for subsea connector development was military applications, however, over time demand for such connectors increasingly was to satisfy need in the offshore oil industry. However, military applications for harsh environment subsea connectors continue to grow and evolve.

Early underwater connectors were electrical "dry-mate" devices, intended to be mated prior to immersion in the sea and were of two principal types: rubber-molded "interference fit" type and rigid-shell connectors. The rubber molded "interference-fit" connectors depended on receptacles with elastic bores that stretched and sealed over mating plugs. The rigid-shell connectors had mating parts sealed together via O-rings or other annular seals.

Teledyne Oil & Gas has been an industry leader in the development of subsea connectors and applications. Dr. James Cairns' article *Hybrid Wet-Mate Connectors: 'Writing the Next Chapter'*, Sea Technology, published July 1997, provides a thorough discussion of the history of underwater connectors through to 1997, and is a source for this background summary. In the early 1960s, electrical connectors intended for mating and de-mating underwater came into use. These so called "wet-mate" connectors were adaptations of the interference-fit dry-mate versions, and were designed so that when mated, the water contained in the receptacle bores would be substantially expelled prior to sealing. Also during this time, the first oil-filled and pressure-balanced electrical connector designs were introduced. These designs isolate the receptacle contacts within sealed oil-chambers which, during engagement, are penetrated by elongated pins with insulated shafts. Connection is, therefore, accomplished in the benign oil, not in harsh seawater. Unlike previous connector types which could not be disengaged at even modest depths, pressure balancing type connectors may be actuated anywhere in the sea. These wet-mate oil-filled connectors eventually became the high-reliability standard for the offshore oil industry. One critical design element of oil-filled connectors is providing seals that allow the oil chambers to be penetrated repeatedly while minimizing loss of oil (design will lose a few mL of oil at each remate cycle) and not allowing seawater intrusion. One design widely used for electrical applications accomplishes this through the use of dielectric pistons, one of which resides in each receptacle socket. Each piston has a spring which biases it outward to automatically fill the socket's end-seal when the plug pin is withdrawn. During mating the pins push these pistons back through the oil-chamber ports (which they have kept sealed) and onward deep inside the sockets.

Early subsea wet-mate optical connectors passed only one optical circuit and used expanded-beam lenses or fiber-to-fiber physical contact junctions. To protect the optical interfaces, both the plug and receptacle contacts were housed in oil-filled chambers which were pressure balanced to the environment. Problems with this design included that sealing and cleanliness were not adequate to provide desired reliability. The spring/piston concept used for sealing electrical connectors doesn't work for optical connectors as pistons get in the way of the light path. A second type of subsea-mateable optical connector consisted basically of dry-mate connectors which had a bit of optical index-matching gel placed in the contact interfaces. The excess gel was expelled upon mating. There was no attempt to exclude sand or silt from the interfaces, and the resulting performance was left to chance. Hybrid wet-mate devices were an attempt to combine oil-filled and pressure-balanced plug and receptacle housings with means for sealing and maintaining cleanliness of the optical interfaces. Within both plug and receptacle oil chambers, groups of contact junctions are aligned behind cylindrical rubber face-seals. When mated, opposed plug and receptacle seals first press against each other like the wringers of an old-fashioned washing machine, forcing the water out from between them. As the mating sequence continues the opposed plug and receptacle seals, like the wringers, roll in unison and transport any debris trapped between them off to the side. The action simultaneously causes clean, sealed, oil-filled passages to open between opposed plug and receptacle contact junctions. Continuing the mating process, plug pins advance through the sealed passages to contact sockets within the receptacle. De-mating is just the reverse sequence. In the case of electrical circuits each mated pin/socket junction is contained in an individual, secondary, sealed oil chamber within the common oil volume. The contacts are never exposed to the outside environment before, during or after mating.

There are many types of connectors for making electrical and fiber-optic cable connections in hostile or harsh environments, such as undersea or submersible connectors which can be repeatedly mated and de-mated underwater at great ocean depths. Current underwater connectors typically comprise releasably mateable plug and receptacle units, each containing one or more electrical or optical contacts or junctions for engagement with the junctions in the other unit when the two units are mated together. Each of the plug and receptacle units or connector parts is attached to cables or other devices intended to be joined by the connectors to form completed circuits. To completely isolate the contacts to be joined from the ambient environment, one or both halves of these connectors house the contacts in oil-filled, pressure-balanced chambers, this is referred to as a pressure balanced set-up. Such devices are often referred to as "wet-mate" devices and often are at such great depths that temperature and other environmental factors present extreme conditions for materials used in such devices. The contacts on one side (plug) are in the form of pins or probes, while the contacts or junctions on the other side (receptacle) are in the form of sockets for receiving the probes.

Typically, the socket contacts are contained in a sealed chamber containing a dielectric fluid or other mobile substance, and the probes enter the chamber via one or more sealed openings. Such wet-mate devices have previously been pressure compensated. One major problem in designing such pressure compensated or pressure balanced units is the performance and longevity of seals required to exclude seawater and/or contaminates from the contact chamber after repeated mating and de-mating.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. Examples of prior pressure compensated wet-mate devices are described in U.S. Pat. Nos. 4,616,900; 4,682,848; 5,838,857; 6,315,461; 6,736,545; and 7,695,301.

In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

U.S. Pat. No. 4,666,242 of Cairns describes an underwater electro-optical connector in which the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and de-mating.

Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns. These overcome some of the reliability problems of penetrable seals, for example, but can be too complex for miniaturized connectors.

Most existing wet-mate connectors of the pressure compensation type depend on elastomers, which have several known disadvantages and which only grow as required temperature and pressure performance in the operating environments increase. Above 350° F. in particular, but at lower temperatures as well, elastomers in seawater degrade rapidly, and can fail due to numerous causes, including: rupture; rapid gas decompression (RGD) embolisms; leakage; melting; and gas permeation. Materials science has advanced to create new materials capable of functioning and lasting in harsher environments, but the industry is moving towards temperature regimes at or in excess of 400° F., where even the newest materials will be stressed to or beyond their limits.

Other pressure compensation systems typically rely on metal bellows, which have different weaknesses. At the scale of ever-smaller feed-through systems, where diameters of compensation systems are typically less than an inch, the metal of the bellows are extraordinarily thin, and the welded joints may be subject to fatigue, opening up failure pathways similar to those of elastomers. One primary concern with deployable embodiments of wet-mate devices regarding pressure compensation is the use of elastomeric hoses. Operators experience signal loss on gas and gas-lift wells during start up and shutdown. At these events the gas functions in the well are dynamic and not at equilibrium. In addition, pressure compensated systems in gaseous environments have experienced complete loss of pressure compensation and infiltration of seawater into spaces that should be dielectrically insulated by oil.

Thus, what is needed is a system that eliminates the pressure compensation elements and reduces complexity, but more importantly reduces potential failure modes and can depend on materials more suited for the temperature and pressure requirements (not to mention seawater and corrosive gases), metals in particular, while substantially reducing dependence on elastomers.

SUMMARY OF THE INVENTION

The present invention provides a submersible or harsh environment connector for use with electrical, optical or electro-optical cables having first and second connector units which are releasably mateable and that are not pressure compensated. Alternatively, this may be referred to as a wet-mate without pressure balancing system for making a subsea wet-mate connection. The invention uses a reservoir of fluid and a mechanism energized by mating, such as by a spring, to push that fluid into a small mated connection, discharging an equivalent volume of seawater and creating electrical and/or optical continuity. One-way or back-flow prevent valves ensure that there is no return flow of seawater. Typical fluids would be dielectric oil or optical gel.

The invention provides a connector assembly for making a wet-mate connection for electrical or optical or hybrid systems without requiring a pressure compensation system. It uses an active mechanism which captures energy from the mating of the subsea systems to energize a discharge system. The discharge system ejects seawater from a small volume and replaces it with dielectric fluid, insulating the connection and ensuring continuity.

Figure 1:
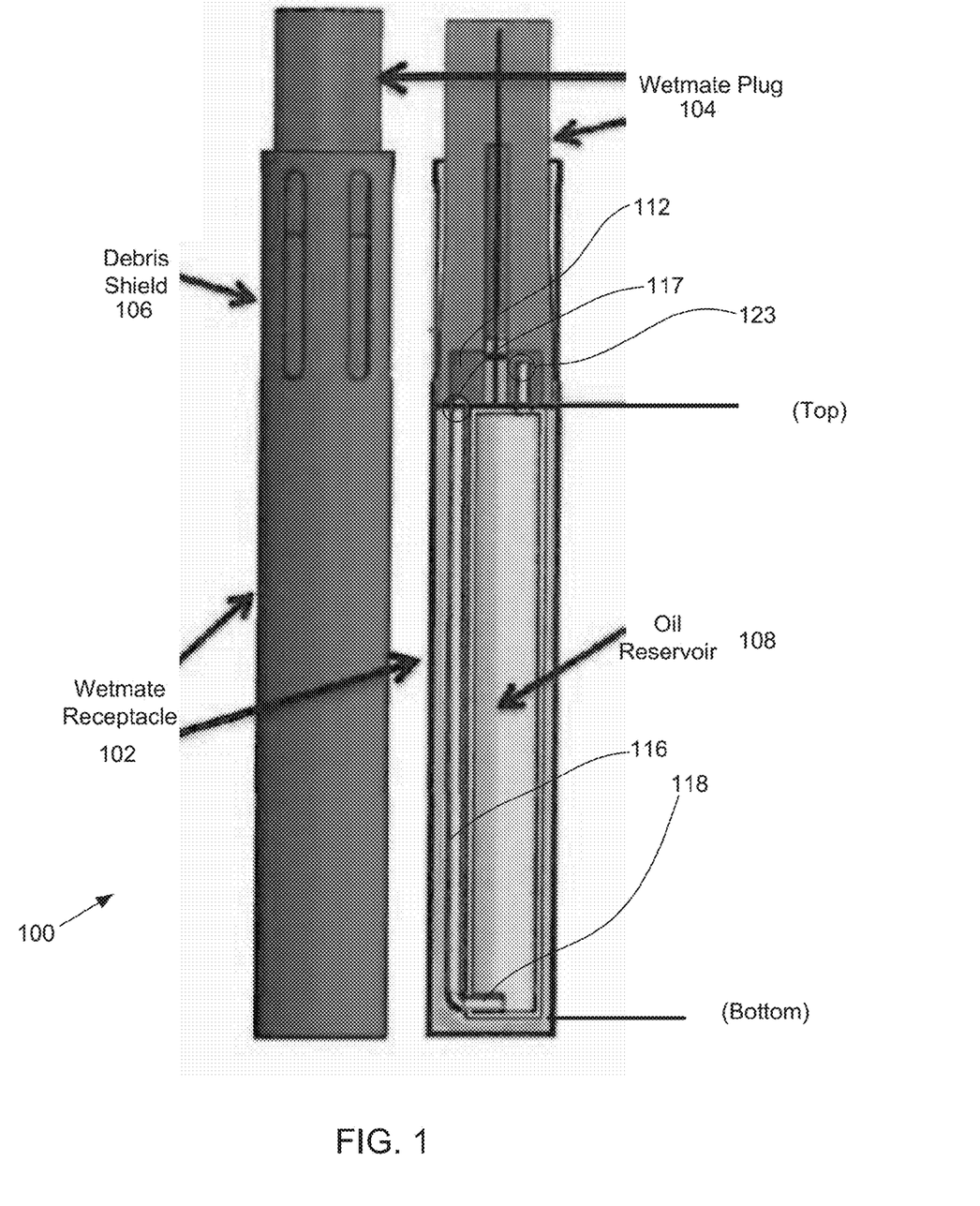
FIG. 1 is a diagram showing a closed cycle "CC" oil reservoir wetmate connector in accordance with a first embodiment of the invention.
Figure 2:
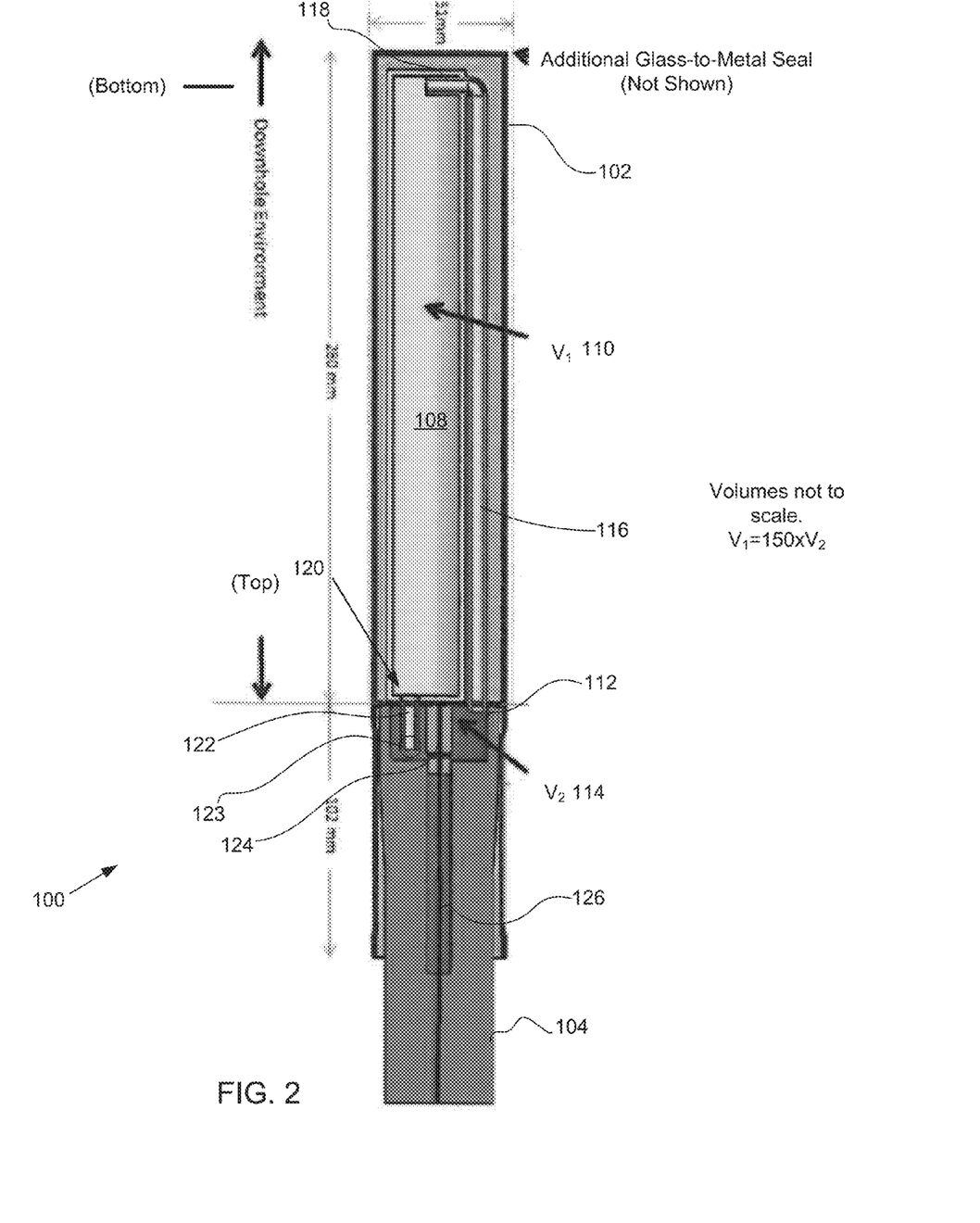
FIG. 2 is a diagram showing a detailed illustration of the CC connector of FIG. 1.
Figure 3:
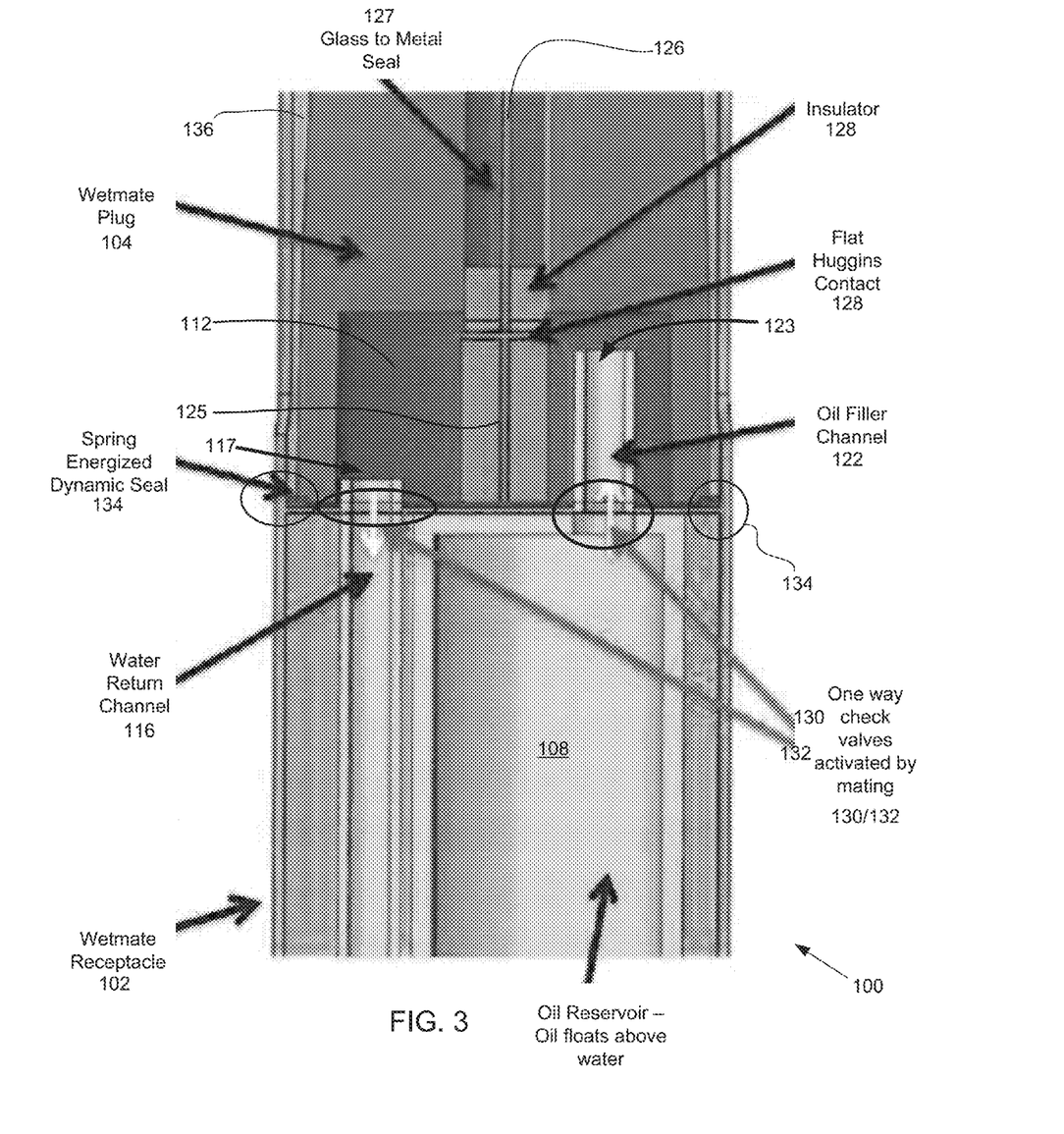
FIG. 3 is a diagram showing a detailed illustration of the closed cycle oil reservoir connections in a connected state related to the CC connector of FIG. 1.

The invention is described herein using two exemplary embodiments for non-pressure compensated wet-mate systems. The first of the two exemplary embodiments is a "Closed cycle" type system, as illustrated in FIG. 1-3. The high temperatures and pressures, as well as vibration, present in subsea Christmas tree environments complicate separation of oil and seawater and make the closed cycle embodiment less practical. This closed cycle system includes one way valves as essential elements of the design.

Figure 4:
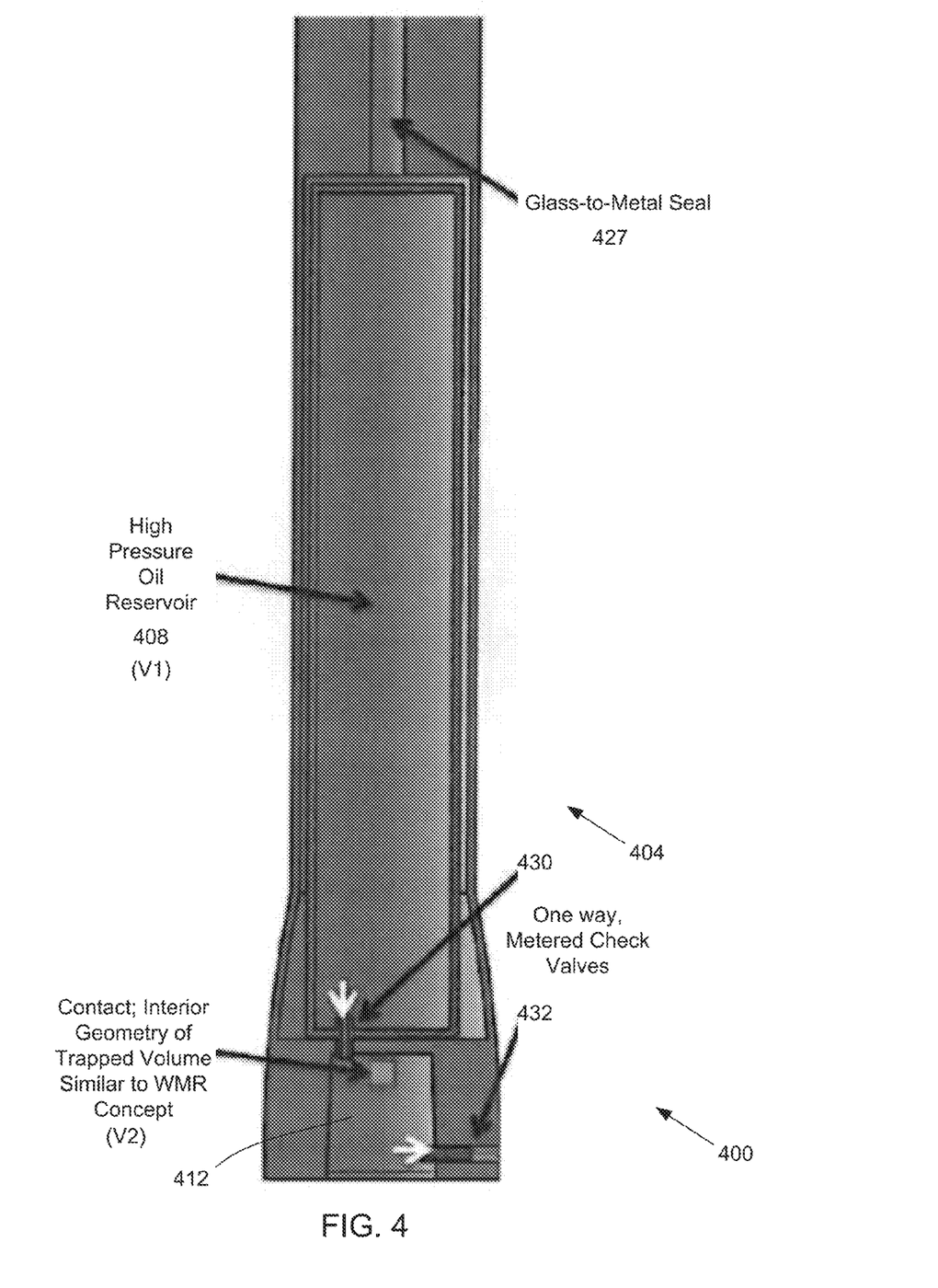
FIG. 4 is a diagram showing a Pressurized oil reservoir "POR" wetmate connector in accordance with a second embodiment of the invention.

The second exemplary embodiment is a "Pressurized Oil Reservoir" (POR) type system, and illustrated in FIG. 4, can be considered the preferred design implementation of the present invention. As described in detail below, oil is pressurized, such as by a spring or a gas pre-charge in some cases. Mating opens a pair of one way, metered-flow valves. The Differential Pressure ($\Delta P$) between the tank and the captured volume in the mated area causes oil to flow from the reservoir into the mated area, and the seawater initially captured in the mated volume is discharged into the surroundings. The pressure in the mated area after discharge would be at least equal to the environmental pressure, allowing de-mating.

One key point of distinction between the invention broadly stated and the particular exemplary embodiment of the POR described herein is in the mechanism for creating a $\Delta P$ sufficient to overcome the high ambient pressure of seawater at typical depths (4,000 psi would be a typical value for these devices to operate.) A spring used during mating compresses and stores energy that is partially discharged when the valves open. The POR embodiment described herein has a fixed pre-charge given to the oil during assembly.

Both the closed cycle and the POR devices depend on a reservoir of dielectric fluid. Both presume a small volume of seawater is captured during mating. Both discharge that captured seawater and replace it with dielectric fluid. Both use metered one-way flow valves to prevent back flow of seawater into the mated volume or reservoir and to minimize the amount of oil that can be discharged in a single mate cycle. It is principally in the mechanics of charging the reservoir that they differ.

In one respect the invention is preferably configured to simplify assembly and create the same $\Delta P$ for each and every mate and de-mate cycle. The POR described below has a fixed initial Pressure that can only decrease unless the device is disassembled. But at the very simplest level, both operate along essentially the same lines.

In one embodiment, the invention provides a connector, having: a first connector unit having a first contact chamber and a first contact assembly within the first contact chamber; a second connector unit having a second contact chamber and a second contact assembly within the second contact chamber; each contact chamber having a forward end and a forward end opening configured to be opposingly brought together during a mating process; each connector unit having a central longitudinal axis, the connector units being movable between an unmated condition and a releasably mated condition in which: the first and second contact assemblies are in communication; a forward end wall of the first connector unit is in sealing engagement with an opposing portion of the second connector unit and forms a sealed cavity defining a volume between the forward end wall of the first connector and the opposing portion of the second connector unit; at least one of the first and second connector units having a reservoir containing an insulating fluid and a means for releasing the insulating fluid from the reservoir during a mating process thereby expelling ambient fluid from the cavity, wherein in a mated condition the cavity is filled with insulating fluid.

The connector being further characterized by one or more of the following: the insulating fluid is either a dielectric fluid or an optical gel; the means for the reservoir contains a fluid under pressure; a spring deployed intermediate the first and second connector units so as to come under load during the mating process, wherein the spring under load causes the insulating fluid to be released from the reservoir; a locking mechanism to maintain the compression of the spring during de-mating; a piston operatively disposed to compress the insulating fluid within the reservoir to cause the fluid to be released from the reservoir; the piston including a seal designed to keep ambient fluid from infiltrating the reservoir during operation; the reservoir containing sufficient insulating fluid to expel ambient fluid over repeated mating and de-mating operations; the first and second contact assemblies comprising a plurality of electrical conductors; the first and second contact assemblies comprising a flat Huggins-type contact; the means for releasing the insulating fluid from the reservoir including two or more one-way valves, a first one-way valve allows flow of the insulating fluid from the reservoir into the cavity, the second one-way valve permitting flow of ambient fluid out of the cavity during mating process; at least one of the one-way valves being a metered valve; the insulating fluid releases from the reservoir at a top end, a conduit extending the length of the reservoir and receiving ambient fluid from the cavity and permitting flow to the opposite bottom end of the reservoir while under pressure during the mating process, gravity keeping the ambient fluid separated from the remaining insulating fluid in the reservoir following the mating process.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Moreover, although the invention is described in the context of feedthrough systems, it will be understood that this exemplary description is for explanation purposes and the invention is not so limited to the systems described herein and, for example, is intended for use in other subsea, oceanographic and defense systems and applications. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

FIGS. 1-4 illustrate two embodiments of non-pressure balanced subsea connectors in accordance with the present invention. FIGS. 1-3 illustrate a single circuit underwater electrical connector according to a first closed cycle "CC" receptacle embodiment of the present invention. FIG. 4 illustrates a Pressurized Oil Reservoir "POR" implementation in the plug component of the connector in a second embodiment of the present invention. Although the connectors of FIGS. 1-4 are shown as connecting two electrical conductors with suitable end connectors or contacts. The connector may be modified to make an optical or hybrid cable connection in an equivalent non-pressure balanced optical connectors. FIGS. 5-8 illustrate exemplary configurations of the spring-biased component having a locking mechanism to prevent backward movement and maintain spring pressure.

With reference to FIGS. 1-3, the connector 100 is of the closed cycle oil reservoir type having a receptacle 102 and plug 104 for subsea wetmate connection. Wetmate receptacle 102 includes oil reservoir 108 in which a dielectric fluid is contained. Wetmate receptacle 102 includes a debris shield 106 that extends from the top of reservoir 108 to help block sand and sediment and other debris from interfering with mating and de-mating operation. With wetmate plug 104 received into wetmate receptacle 102 in a mated position, a cavity 112 is defined between the bottom of the plug 104 and the top of the reservoir 108 portion of receptacle 102. A conduit 116 travels along the length of oil reservoir 108 and has a reservoir output 118 disposed at the bottom of the conduit 116 and reservoir 108 and a conduit intake 117 at the top of the conduit opposite the output 122/123 of reservoir 108 and disposed to receive seawater or other fluid trapped in the cavity 112 during mating. The pressure of the dielectric fluid entering cavity 112 from reservoir 108 forces the trapped fluid into conduit 116.

With reference to FIG. 2, connector 100 is shown oriented in an inverted or "upside-down" position in contrast to how it is preferably installed in the field. Oil reservoir 108 defines a volume (V1) 110 and has an opening 120 at the top of the reservoir adjacent cavity 112 and is in fluid communication with oil filter conduit or channel 122 in direct fluid communication with cavity 112 at opening 123. During the mating process, a small volume (V2) 114 of seawater is trapped and present in the cavity 112. Electrical conductors respectively extend through the lengths of the receptacle 102 and plug 104. During mating, flat contacts, e.g., flat Huggins contacts, on respective ends of the conductors 125 and 126 of the receptacle 102 and plug 104 come into contact which each other to make an electrical connection to permit the flow of electricity.

With reference to FIGS. 2-3, in the mated position, exemplary flat Huggins contacts 128 are shown terminating from the respective ends of conductors 125 (receptacle 102) and 126 (plug 104). Insulator 124 surrounds and electrically insulates conductors 125, 126. Conductor 126 is shown as being surrounded within plug 104 with a glass-to-metal seal 127. During mating, one-way check valve 130 operates to permit flow of dielectric fluid from within reservoir 108 through oil filter channel 122 and into cavity 112 via opening 123. Corresponding flow of seawater trapped in cavity 112 flows into water return channel or conduit 116 at a top end intake opening 117 by one-way check valve 132. The check valves 130/132 cooperate to prevent unwanted backflow of seawater from conduit 116 into cavity 112 and channel 122.

The bottom end of plug 104 butts against the top end of receptacle 102 and seats against annular spring energized seal 134. After mating, gravitation works to separate oil from seawater within reservoir 108 and oil floats above the seawater in reservoir 108. In this manner the receptacle 102 and plug 104 of the CC connector 100 of FIG. 1 may be repeatedly, releasably mated in harsh subsea environments to make an electrical connection.

In this manner, the non-pressure compensated connector 100 uses a reservoir of fluid and a mechanism energized by mating to push that fluid into a small mated connection, discharging an equivalent volume of seawater and creating electrical and/or optical continuity. It uses an active mechanism, in this example a spring, which captures energy from the mating of the subsea systems to energize the discharge system. One-way or back-flow prevent valves, e.g., 130, 132, ensure that there is no return flow of seawater at the site of the electrical/optical connection, e.g., into cavity 112. Typical fluids would be dielectric oil or optical gel. In the case of an electrical connection, the discharge system ejects seawater from a small volume and replaces it with dielectric fluid, insulating the electrical connection and ensuring continuity. The high temperatures and pressures and vibration associated with subsea Christmas tree environments complicate separation of oil and seawater. Gravity aids in separation so orientation of the connector is important in a closed system. The closed cycle connector 100 of FIGS. 1-3 includes one-way or unidirectional flow valves as means for accomplishing this.

Now with respect to FIG. 4, a "Pressurized Oil Reservoir" (POR) type connector 400 is shown in which oil is pre-charged with pressure, for example by a gas, within high pressure oil reservoir 408. Mating receptacle 402 with plug 404 opens a pair of one way, metered-flow valves 430 and 432. The Differential Pressure (ΔP) between the tank and the captured volume in the mated volume 412 causes oil to flow from the reservoir into the mated area, and the seawater initially captured in the mated volume is discharged into the surroundings.

One key point of distinction between the invention broadly stated and the particular exemplary POR connector 400 is in the mechanism for creating a ΔP sufficient to overcome the high ambient pressure of seawater at typical depths (4,000 psi would be a typical value for these devices to operate.) A spring used during mating compresses and stores energy that is partially discharged when the valves open. The POR embodiment described herein has a fixed pre-charge applied to the oil during assembly.

Both the closed cycle CC connector 100 and the POR connector 400 depend on a reservoir of dielectric fluid. Both presume a small volume of seawater is captured during mating. Both discharge that captured seawater and replace it with dielectric fluid. Both use metered one-way flow valves to prevent back flow of seawater into the mated volume or reservoir and to minimize the amount of oil that can be discharged in a single mate cycle. It is principally in the mechanics of charging the reservoir that they differ.

POR connector 400 has a fixed initial pressure in dielectric fluid reservoir 408 that can only decrease unless the device is disassembled. But at the very simplest level, both operate along essentially the same lines.

FIGS. 1 and 2 show an example of a non-pressure balanced system with similar exterior geometry to the design basis, although the diameters and length are necessarily somewhat larger. The system allows the water and oil to separate gravitationally. A small volume of seawater is trapped during mating in cavity 112, as flat contacts 128 establish electrical continuity. Mating also activates a pair of one-way check valves 130, 132 to allow oil to flow up from the reservoir 108 and trapped seawater from cavity 112 to pass through conduit 116 to sink and enter at the bottom of the reservoir via conduit outlet or exit 118. Any small amount of water in the mating volume 112 not displaced similarly sinks away from the contact point 128, and does not create a short in the system.

A design goal is to minimize the mating volume, e.g., 2 to 5 mL, in cavity 112, the size of the reservoir 108 is kept manageably small at preferably about 100 to 150 times the mating volume, e.g., 200 to 700 mL. Depending on application requirements and effectiveness, volumes may require larger geometry than this design basis. For example, the volume associated with the connector configurations described herein would contain approximately 350 mL, enough to allow 100 mates and de-mates with a respectable margin to allow for leakage and keep the water and oil from mixing if the mating volume were under 3 mL.

FIG. 3 shows in detail key connector components. Note that the mating volume and other geometry in the wetmate (WM) plug 104 as shown are not necessarily to scale and are intended only to demonstrate the concept for purposes of describing the invention. In commercial implementation design details will vary. Also, there are several design possibilities to use in termination of the wire to the contact. Such details are not essential to the present invention and are matters of design choice. Various forms of Tubing Encapsulated Cable (TEC) could be used, from DHG cable to custom, sealed, oil-filled Inconel, could be utilized, among other possibilities. The important point of the system is that the point of contact between the conductors of the Wetmate Plug and the Wetmate Receptacle are briefly exposed to seawater before the water is moved away and replaced with dielectric oil. The oil fills (or nearly fills) the contact volume (cavity 112) and provides contact insulation.

One design consideration is that during de-mating a small amount of dielectric oil may be lost. However, the contained volume of oil is intended to be on the scale of a few milliliters (else the reservoir would need to be undesirably large), so any discharge is preferably of relatively small amount. Of further design consideration is for the debris shield. Present debris shields include a spring-loaded, slotted system, which would not be desirable as it would make the establishment of a seal around the mating volume problematic. Alternative designs for debris protection may be implemented and this component is not limiting to the present invention.

With respect to FIG. 4, POR wetmate connector 400 is shown having a plug 404 with an internal pressurized oil reservoir 408. Like the closed-cycle wetmate connector 100, the POR wetmate connector 400 allows a volume of trapped seawater to be replaced by oil from reservoir 408. Here the reservoir 408 is in the plug portion 404 of the connector 400 as opposed to the receptacle portion 102 of the connector 100. Also unlike CC connector 100, POR connector 400 contains a pressurized reservoir 408 and uses metered-flow check valves 430, 432 to discharge the trapped seawater during mating. The particular manner in which the wire passes from the glass-to-metal seal 427 at the top to the contact in the mating volume or cavity 412 may be handled in a variety of known ways. Conduits and tubing encapsulated cable "TEC" are options. One of ordinary skill in the art would appreciate that this is not critical or limiting to the invention but rather is a matter of decision choice.

Unlike the closed-cycle CC system 100 in FIG. 1, the POR 400 embodiment does not depend on transferring seawater into the dielectric fluid reservoir 408 and then allowing it to separate from the oil (e.g., by gravity due to physical orientation), but rather captured seawater is simply discharged during mating. Some mixing of trapped seawater with dielectric fluid in the mating volume might occur even in the POR embodiment, but a relatively high pressure differential should allow a thorough discharge of the seawater. For example, a $\Delta P$ of 28 megapascal (MPa), and a volume factor of 150 (i.e., $V1=150 \times V2$) would allow ample pressure for discharging the seawater from the captured volume V2 412 for up to 100 mate/de-mate cycles.

Contact surfaces and lip-seal mating between the POR plug 404 and POR receptacle 402 would be as in the closed cycle concept, which also would mean similar debris issue would be addressed to adequately protect the mechanism. The mixing (or lack thereof) between DC-200 fluid and seawater at temperature is of less significance than in the closed-cycle concept. But the behavior of the DC-200 fluid at temperature or pressure (or both) remains a design consideration as the POR system 400 depends on a sufficiently strong pressure vessel for the reservoir 408 that is also small enough to fit into geometry that is relatively tight. A diameter of 50 mm is appropriate.

With respect to one-way metered check valves for use in the non-compensated system of FIG. 4, there are several manufacturers of NACE-compliant (National Association of Corrosion Engineers—NACE International) one way check valves and flow regulators currently certified to 103.5-138 MPa (or about 15 Kpsi—20 Kpsi). A number of candidates for the metered flow valve also exist.

In one manner of operation the connector assembly utilizes the energy associated with the mating process to assist expelling dielectric fluid from the reservoir and flushing out the seawater from the connector cavity. For example, a spring may be used to energize a fluid pump. Using the spring mechanism as shown in FIGS. 5-8, a force is imparted when a subsea mated connection is made. At the mate's point of attack, a small volume containing the connectors (electrical or optical are envisioned) is sealed off, within which ambient pressure seawater is captured. The spring system charges a piston in a reservoir of fluid. Mating opens two, one-way (unidirectional) check valves, either or both of which are metered-flow valves. The valves allow positive flow from a reservoir of dielectric or optical fluid 502 into the mated volume, e.g., in cavity 412, while at the same time ejecting the captured seawater. The piston rod and back side of the head are exposed to seawater, to ensure that no vacuum is created. The net result is electrical or optical continuity without an elastomeric or metallic pressure compensation system. De-mating the system resets the energizing mechanism, allowing a number of mate/de-mate cycles that is limited only by the size of the fluid reservoir. Numerous potential embodiments of the energizing system have been contemplated, from the simple, gear-driven system (shown), to a small, lever driven system like those used in caulk guns, to a fully threaded, PTFE-coated connection which rotates, among others.

Figure 5:
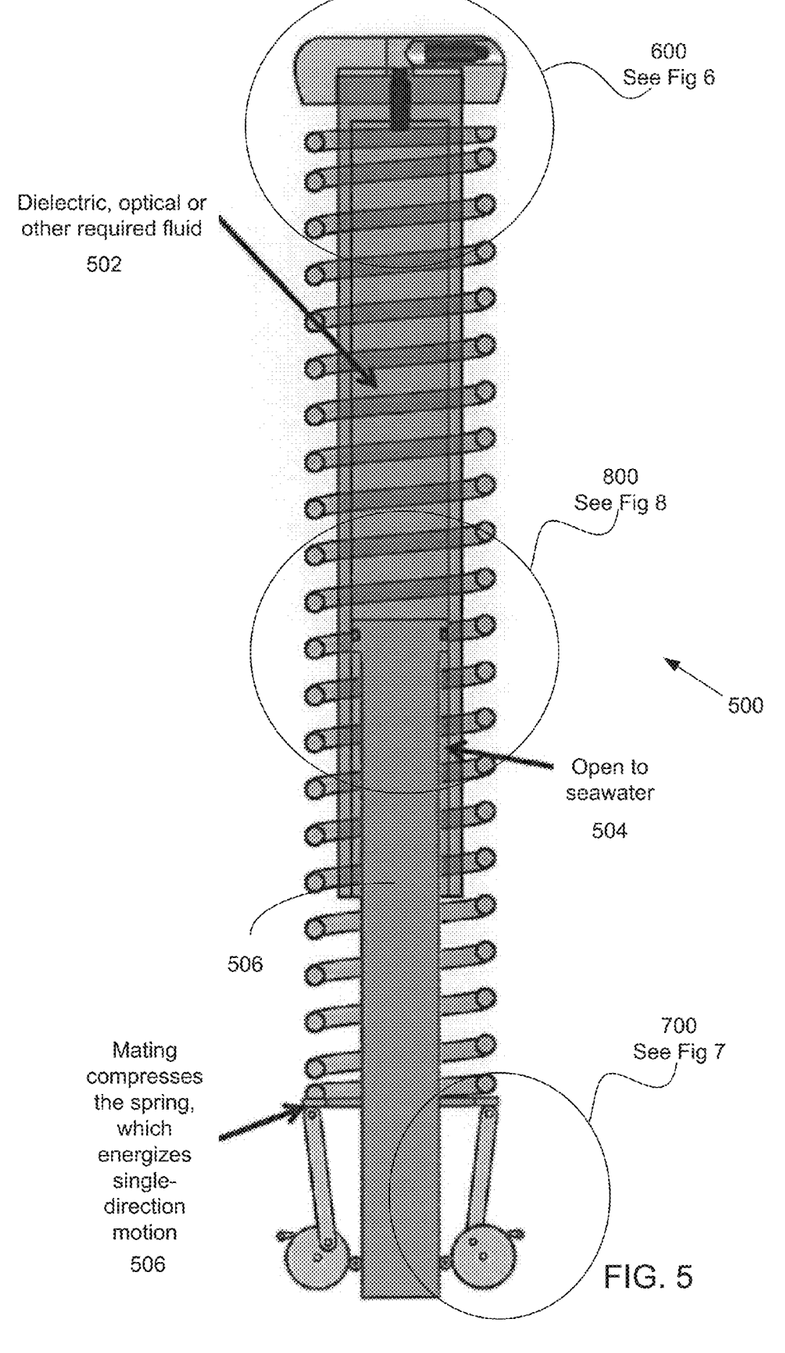
FIG. 5 is a cross-sectional representation of an exemplary spring and ratchet mechanism for use with either of the connector embodiments.
Figure 6:
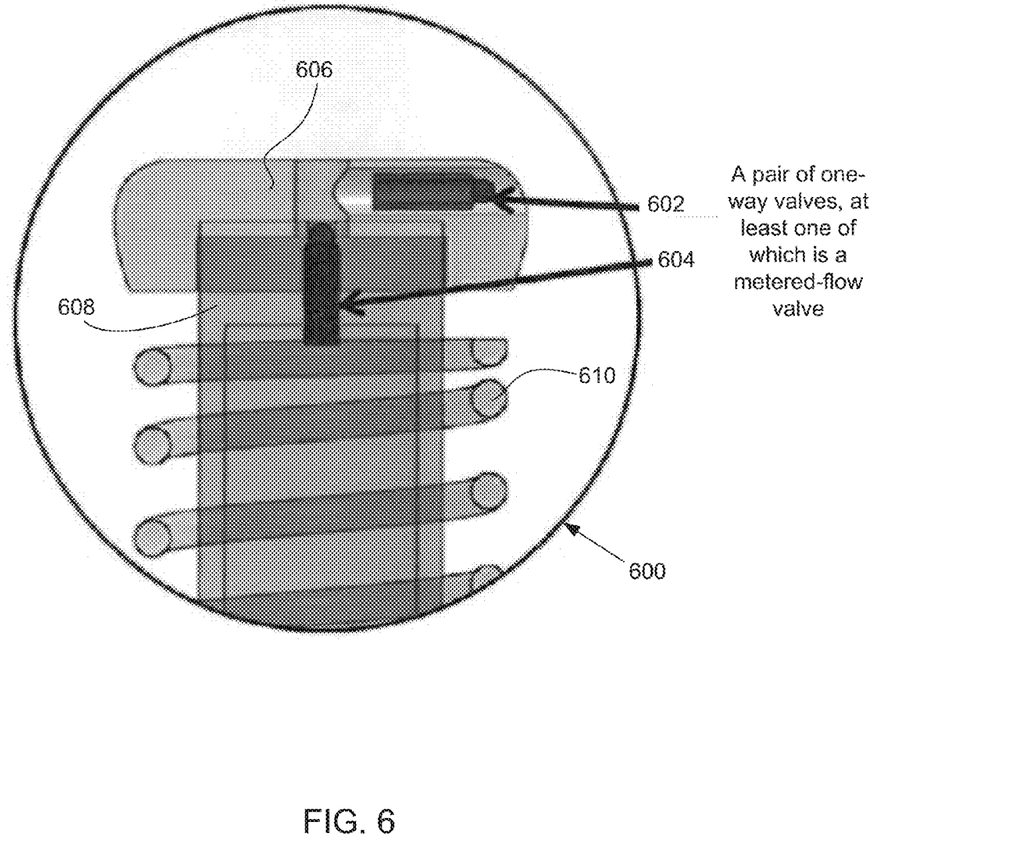
FIG. 6 is an isolated cross-sectional representation showing in detail the unidirectional metered flow valve arrangement of the exemplary spring and ratchet mechanism of FIG. 5.
Figure 7:
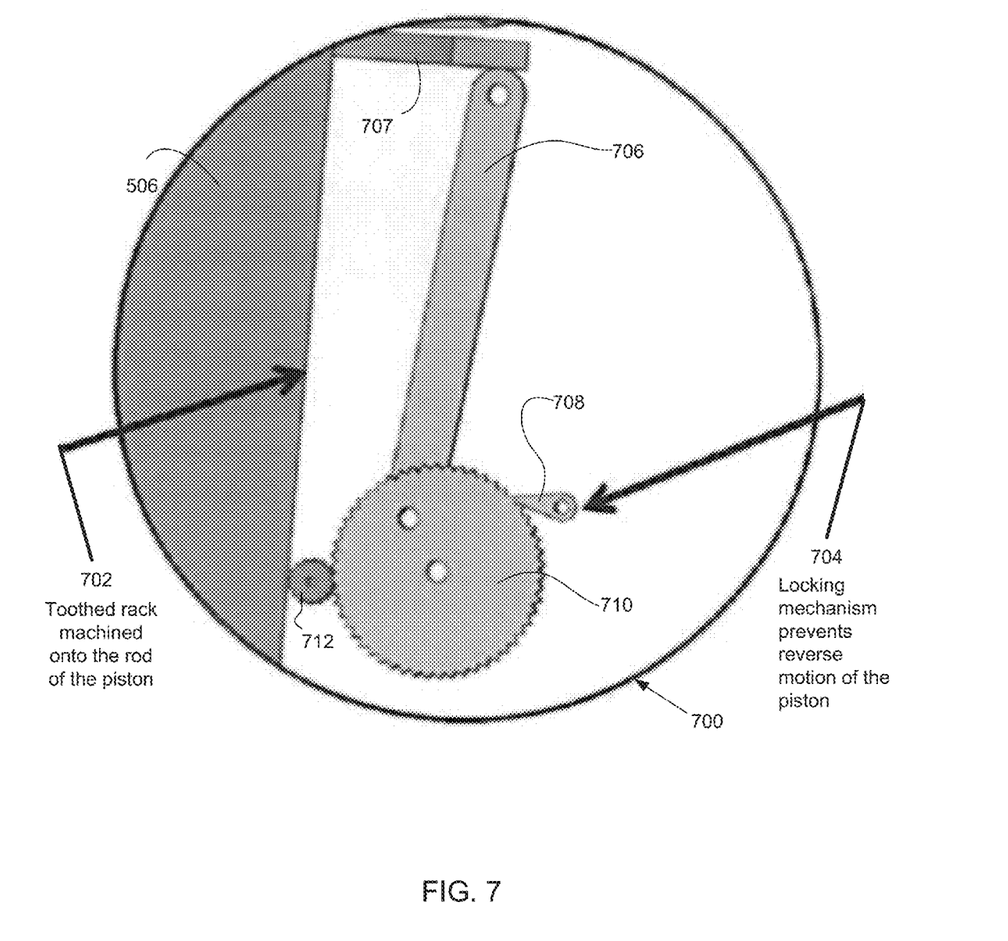
FIG. 7 is an isolated view showing in detail the locking ratchet mechanism of the exemplary spring and ratchet mechanism of FIG. 5.
Figure 8:
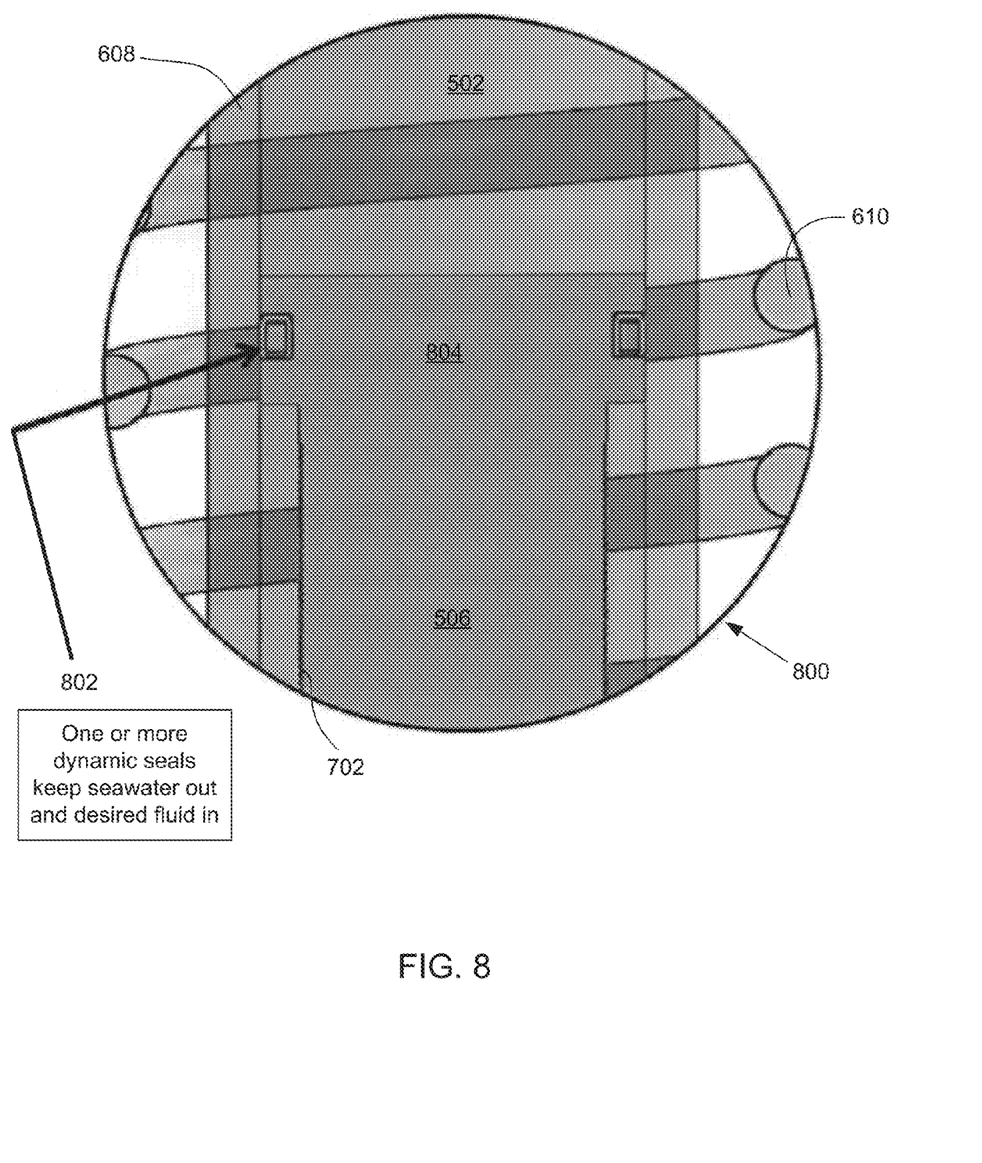
FIG. 8 is an isolated cross-sectional representation showing in detail the dynamic seal arrangement of the exemplary spring and ratchet mechanism of FIG. 5.

FIG. 5 discloses a spring-biased connector member 500 and FIGS. 6-8 disclose enlarged partial views of the spring-biased connector member 500 of FIG. 5. Connector member 500 is shown having a reservoir 502 filled with a dielectric, optical gel or other appropriate fluid. A piston 506 moves in one direction during mating (stays in place during de-mating) of the connector. During mating, the piston 506 imparts a force upon the fluid contained in reservoir 502 so as to cause the dielectric or other fluid to exit the reservoir under pressure via valve arrangement 600 of FIG. 6.

FIG. 6 is an enlarged view of the valve arrangement 600 comprised of valves 602 and 604, both of which are one-way check valves and one or both is a metered-flow valve. The valves 602, 604 are disposed in head portion 606 of the connector 500.

FIG. 7 is an enlarged view 700 of locking mechanism or means 704. In this example the locking means 704 comprises a toothed rack 702 machined onto the outer surface of piston 506. During mating, piston 506 is driven upward to cause a desired amount of dielectric or other fluid to exit the reservoir. In this process, the teeth of gear 712 cooperate with the mating tooth rack 702 and teeth of gear 710 to impart movement on the structure. Once in a mated position, a lock 708 engages with the teeth of gear 710 to prevent a backward movement of piston 506 even during de-mating of the connector. As an alternative, the system may not lock the piston. The vacuum caused by filling the chamber and closing the valves would do so, but it would allow the piston to act as a pressure compensation system. It in one sense changes the nature of the device. Spring 610 becomes further under load during repeated mating operations as it is compressed between the rear of the head 606 and the shelf 707.

FIG. 8 is an enlarged view 800 of the seal mechanism 802 used in the head 804 of piston 506 to isolate the dielectric or other fluid contained in reservoir 502 from ambient environment, including seawater that surrounds the length of piston 506 within cylindrical reservoir housing 608. Elastomeric O-rings or other suitable sealing means may be used as appropriate for the conditions the connector will encounter.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes.

The invention claimed is:

1. A connector, comprising:
    a first connector unit having a first contact chamber and a first contact assembly within the first contact chamber;
    a second connector unit having a second contact chamber and a second contact assembly within the second contact chamber;
    each contact chamber having a forward end and a forward end opening configured to be opposingly brought together during a mating process;
    each connector unit having a central longitudinal axis, the connector units being movable between an unmated condition and a releasably mated condition in which:
        the first and second contact assemblies are in communication;
        a forward end wall of the first connector unit is in sealing engagement with an opposing portion of the second connector unit and forms a sealed cavity defining a volume between the forward end wall of the first connector and the opposing portion of the second connector unit; and
    at least one of the first and second connector units having a reservoir containing an insulating fluid and a means for releasing the insulating fluid from the reservoir during a mating process thereby expelling ambient fluid from the cavity, wherein in a mated condition the cavity is filled with insulating fluid;
    wherein a piston operatively disposed to compress the insulating fluid within the reservoir to cause the fluid to be released from the reservoir;
    wherein the piston includes a seal preventing ambient fluid from infiltrating the reservoir during operation.

2. The connector of claim 1, wherein the insulating fluid is either a dielectric fluid or an optical gel.

3. The connector of claim 1, wherein the insulating fluid contained in the reservoir is under pressure.

4. The connector of claim 1, wherein the reservoir contains sufficient insulating fluid to expel ambient fluid over repeated mating and de-mating operations.

5. The connector of claim 1, wherein the first and second contact assemblies comprise a plurality of electrical conductors.

6. The connector of claim 1, wherein the first and second contact assemblies comprising a flat Huggins-type contact.

7. The connector of claim 1 further comprising a conduit having a top end in fluid communication with the cavity and a bottom end in fluid communication with the reservoir, wherein the reservoir includes a top end and a bottom end and the insulating fluid releases from the reservoir top end, the conduit receiving ambient fluid from the cavity at the conduit top end and permitting flow through the conduit and out the conduit bottom end and into the reservoir at the reservoir bottom end while under pressure during the mating process.

8. The connector of claim 1, further comprising a spring disposed intermediate the first and second connector units so as to come under load during a mating process, wherein the spring under load causes the insulating fluid to be released from the reservoir into the cavity.

9. The connector of claim 8, further comprising a spring locking mechanism configured to engage the spring and to maintain the compression of the spring during de-mating.

10. The connector of claim 1, wherein the means for releasing the insulating fluid from the reservoir includes: a first one-way valve disposed to allow flow of the insulating fluid from the reservoir into the cavity during a mating process; and a second one-way valve disposed to allow flow of ambient fluid out of the cavity during a mating process.

11. The connector of claim 10, wherein at least one of the first and second one-way valves is a metered valve.

12. A connector assembly, comprising:
- a plug component having a first contact chamber and a first contact assembly within the first contact chamber;
- a receptacle component having a second contact chamber and a second contact assembly within the second contact chamber;
- each contact chamber having a forward end and a forward end opening configured to be opposingly brought together during a mating process;
- the plug and receptacle components each have a central longitudinal axis, the plug and receptacle components being movable between an unmated condition and a releasably mated condition in which:
  - the first and second contact assemblies are in communication;
  - a forward end wall of the plug component is in sealing engagement with an opposing portion of the receptacle component and forms a sealed cavity defining a volume between the forward end wall of the plug component and the opposing portion of the receptacle component; and
- at least one of the plug and receptacle components having a reservoir containing an insulating fluid and a means for releasing the insulating fluid from the reservoir during a mating process thereby expelling ambient fluid from the cavity, wherein in a mated condition the cavity is substantially filled with insulating fluid;
- wherein a piston operatively disposed to compress the insulating fluid within the reservoir to cause the fluid to be released from the reservoir;
- wherein the piston includes a seal preventing ambient fluid from infiltrating the reservoir during operation.

13. The connector of claim 12, wherein the insulating fluid is either a dielectric fluid or an optical gel.

14. The connector of claim 12, wherein the insulating fluid contained in the reservoir is under pressure.

15. The connector of claim 12, wherein the reservoir contains sufficient insulating fluid to expel ambient fluid over repeated mating and de-mating operations.

16. The connector of claim 12, wherein the first and second contact assemblies comprise a plurality of electrical conductors.

17. The connector of claim 12, wherein the first and second contact assemblies comprising a flat Huggins-type contact.

18. The connector of claim 12 further comprising a conduit having a top end in fluid communication with the cavity and a bottom end in fluid communication with the reservoir, wherein the reservoir includes a top end and a bottom end and the insulating fluid releases from the reservoir top end, the conduit receiving ambient fluid from the cavity at the conduit top end and permitting flow through the conduit and out the conduit bottom end and into the reservoir at the reservoir bottom end while under pressure during the mating process.

19. The connector of claim 12, further comprising a spring disposed intermediate the plug and receptacle components so as to come under load during a mating process, wherein the spring under load causes the insulating fluid to be released from the reservoir into the cavity.

20. The connector of claim 19, further comprising a spring locking mechanism configured to engage the spring and to maintain the compression of the spring during de-mating.

21. The connector of claim 12, wherein the means for releasing the insulating fluid from the reservoir includes: a first one-way valve disposed to allow flow of the insulating fluid from the reservoir into the cavity during a mating process; and a second one-way valve disposed to allow flow of ambient fluid out of the cavity during a mating process.

22. The connector of claim 21, wherein at least one of the first and second one-way valves is a metered valve.

* * * * *